United States Patent [19]

McDonald

[11] 4,037,284
[45] July 26, 1977

[54] SWEEPER ASSEMBLY

[75] Inventor: Raymond F. McDonald, Winneconne, Wis.

[73] Assignee: J. I. Case Company, Racine, Wis.

[21] Appl. No.: 694,731

[22] Filed: June 10, 1976

[51] Int. Cl.² .............................................. E01H 1/04
[52] U.S. Cl. ...................................... 15/83; 15/79 R
[58] Field of Search ................. 15/79 R, 79 A, 83–86, 15/340

[56] References Cited
U.S. PATENT DOCUMENTS

| 3,568,232 | 3/1971 | Swanson | 15/83 |
| 3,591,883 | 7/1971 | Armstrong | 15/79 R |
| 3,823,435 | 7/1974 | Rhodes et al. | 15/79 R |

FOREIGN PATENT DOCUMENTS 501,386  4/1920  France .................................. 15/83

Primary Examiner—Edward L. Roberts
Attorney, Agent, or Firm—Cullen, Settle, Sloman & Cantor

[57] ABSTRACT

An improvement in sweepers, particularly of the rotary type shown, comprising a separate guard-drag plate extending downwardly from the hopper at an acute angle to the ground, then turned upwardly adjacent the forward end of the sweeper housing, but spaced therefrom. The arcuate lower surface of the guard-drag plate is spaced below the forward end of the housing, protecting the housing against damage and providing a drag surface which compresses and distributes particulate material and raises the sweeper assembly upon engaging obstacles or accumulations of particulate material.

6 Claims, 4 Drawing Figures

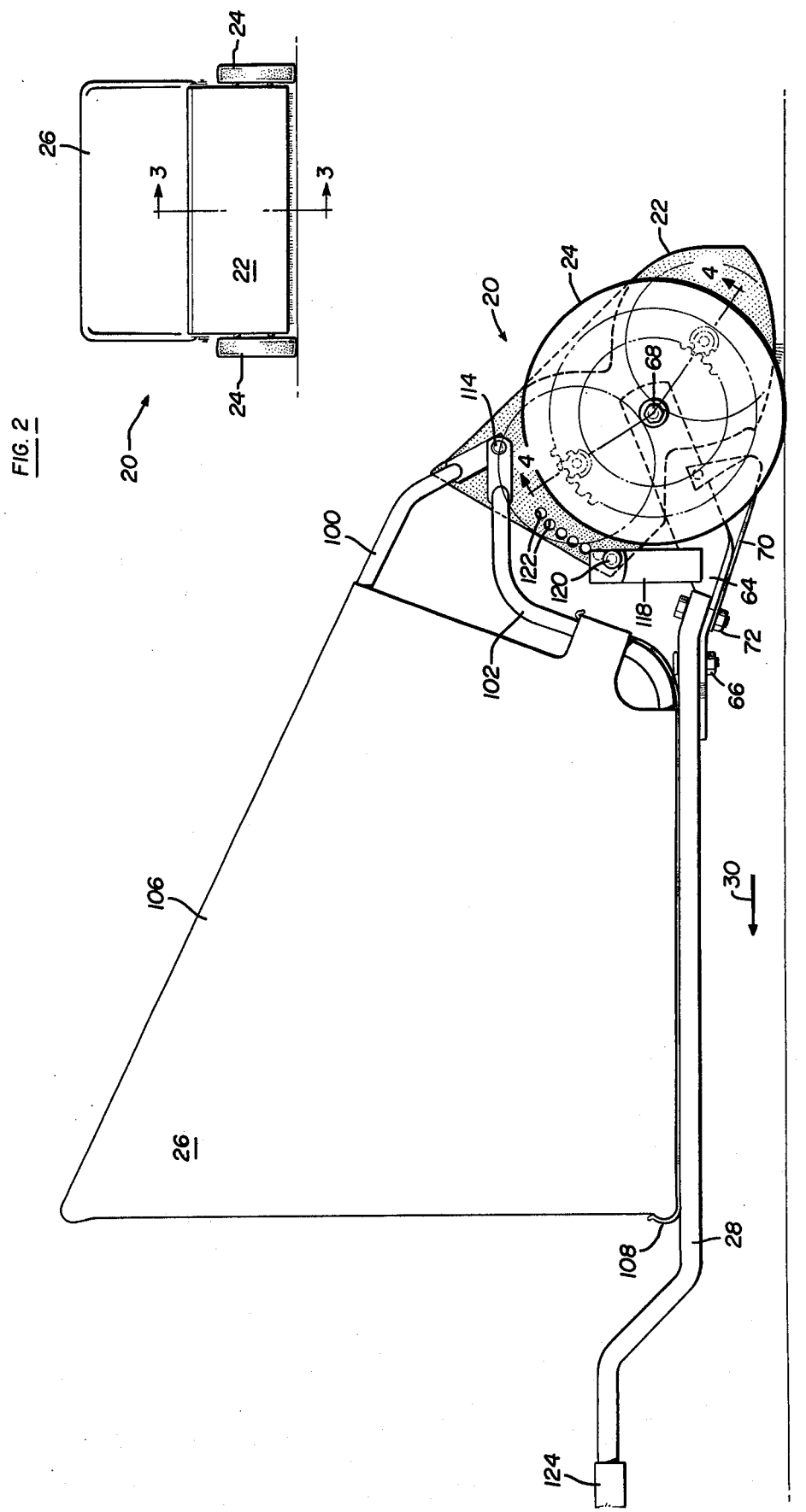

SWEEPER ASSEMBLY

FIELD OF THE INVENTION

The present invention relates generally to lawn sweepers, such as rotary brush sweepers, which may be pulled, towed or drawn by a vehicle or by hand. More particularly, the sweeper assembly of this invention has an improved guard-drag plate extending across the forward end of the housing enclosure which assures optimum collection by the sweeper, while avoiding clogging.

DESCRIPTION OF THE PRIOR ART

The rotary sweepers shown by the relevant prior art may be divided into two types, including single rotary brush sweepers and multiple brush sweepers. The multiple brush sweepers preferably include a ground engaging sweeper brush and an oppositely rotating brush or impeller which receives the particulate material from the sweeper brush and propels the material through an opening in the sweeper housing into a hopper or the like. In the present commercial rotary sweepers, the second brush or impeller is driven by either a chain drive or a belt which can slip or clog with debris. U.S. Pat. No. 3,823,435 of Rhodes et al., which is assigned to the assignee of the instant application, discloses a positive drive sweeper assembly, wherein the sweeper brushes or impellers are driven in opposite directions by internal and external planetary gears located within the wheel hub. The housing is however subject to damage and the housing may become clogged when encountering an accumulation of particulate material.

In the prior art, the oppositely rotating brushes or impellers are defined in a downwardly opening housing or chamber which includes baffles to direct the particulate materials through the housing and out of an exit opening adjacent the top of the housing. For optimum operation of the sweeper, the particulate material should be metered or controlled to avoid clogging. Further, the housing must be protected against stumps, rocks and other obstacles which may damage the housing and the sweeper mechanism. The improvement in the sweeper assembly disclosed in this application prevents damage to the sweeper assembly and controls the volume of particulate material received within the housing.

SUMMARY OF THE INVENTION

As disclosed in the above referenced patent of Rhodes et al and a copending application assigned to the assignee of the instant application, the rotary sweeper assembly of this invention includes an enclosed housing having top and side walls, a lower inlet opening and a forwardly directed outlet adjacent the top of the enclosure. The housing is supported on ground traversing wheels for movement along the ground when the sweeper is pulled or pushed. As stated, the lawn sweeper of this invention may be pulled, towed by a vehicle or drawn or pushed by hand. A rotary brush assembly is provided within the housing enclosure which lifts particulate material into the housing through the inlet opening and propels the particulate material through the outlet into a hopper adjacent the outlet and forward of the housing. The terms "forward" and "rearward" refer to the direction of movement of the sweeper and the terms brushes and impellers are used interchangably herein.

The improved drag-guard plate utilized in the rotary sweeper assembly of the present invention has particular significance in a positive drive two stage sweeper of the type disclosed. The sweeper is designed to provide maximum sweeping capabilities without clogging, however any sweeper will clogg if the volume of particulate material is not metered or controlled and the sweeper assembly may be damaged by rocks, stumps or other obstacles. The guard-drag plate aids in metering the particulate material received by the sweeper and lifts the sweeper assembly over obstacles.

The guard-drag plate of te present invention extends from the hopper assembly at an acute angle to the ground surface toward the lower inlet opening of the housing, preferably less than thirty degrees. The plate is then turned upwardly adjacent the housing, but spaced therefrom, providing an arcuate drag surface or edge spaced below the lower forward end of the housing. The guard-drag plate preferably extends across the entire forward end of the housing protecting the housing from damage and lifting the sweeper assembly upon engaging an accumulation of particulate material or an obstacle, such as a large rock or stump. The drag plate also compresses and spreads the accumulation of particulate material, limiting or metering the material received within the housing. The sweeper is capable of handling substantially all types of lawn sweepings and debris, from grass and leaves, to twigs and nuts.

In the preferred embodiment, the drag-guard plate is secured adjacent one end to the hopper assembly and the opposed end is secured adjacent the housing on opposite sides, providing a free relatively resilient midportion which includes the arcuate drag surface or edge. The guard-drag plate thus provides a skid or drag surface which rides the sweeper over fixed obstacles, such as stumps, curbs, etc., thus protecting the housing, brushes and tow frame from damage. Further, as described above, the guard-drag plate limits the intake of the sweeper to an amount the sweeper brushes can effectively transfer. Excess particulate material may cause clogging which must be manually freed. Finally, the plate compresses or spreads dense areas of particular material over the full width of the brush for ease of pick-up. When very large accumulations of particulate material or debris are encountered, the skid or drag surface will lift the sweeper, breaking the wheel to ground contact, thus stopping the motion of the brushes. At this point, no particulate material will be swept by the brushes, but the particulate material will be spread, permitting removal in a second pass.

Other advantages and mertiorous features of the present invention will be more fully understood from the following description of the preferred embodiments, the claims, and the drawings, a brief description of which follows.

BRIEf DESCRIPTION OF THE DRAWINGS

FIG. 1 is a side elevation of one embodiment of the sweeper assembly of this invention;

FIG. 2 is a rear elevation of the sweeper assembly shown in FIG. 1;

DESCRIPTION OF THE PREFERRED EMBODIMENTS

Figure 3:
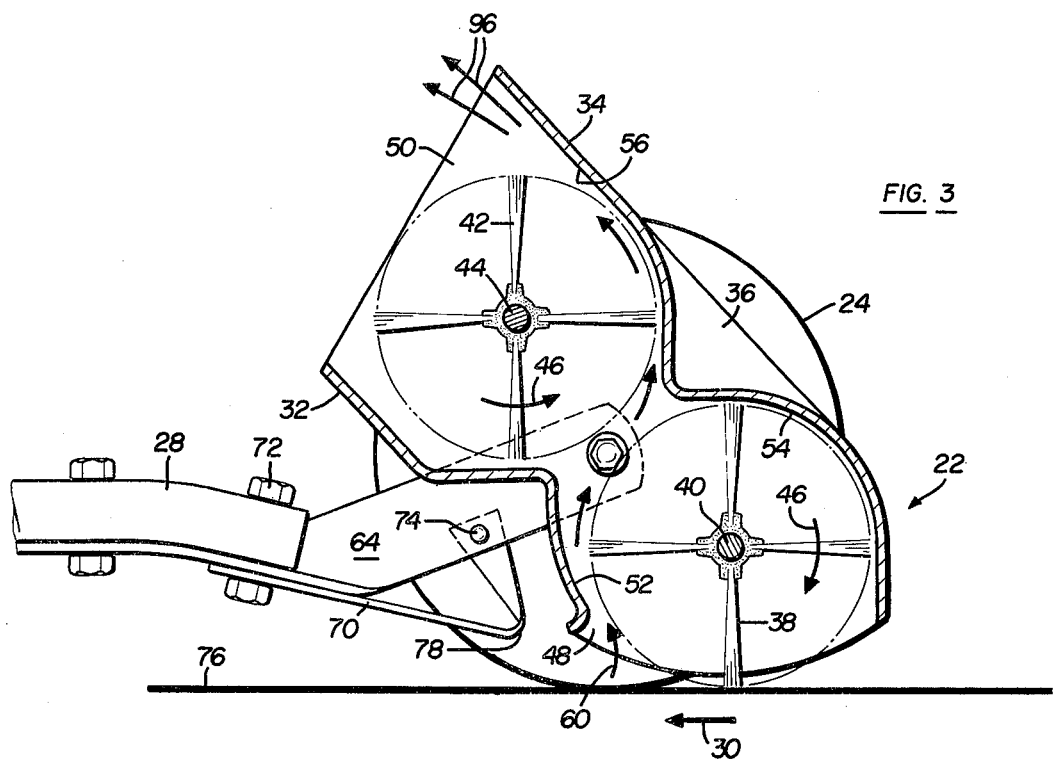
FIG. 3 is a partially cross-sectioned side view of FIG. 2, in the direction of view arrows 3—3.

The sweeper assembly 20 shown in FIGS. 1 and 2 includes a housing enclosure 22, ground engaging and supporting wheels 24, a collection hopper 26 and a draw bar assembly 28. As described below, the draw bar assembly 28. As described below, the draw bar assembly may be connected to a tractor or other vehicle to pull the sweeper assembly along the ground in the direction of arrow 30. The movement of the sweeper assembly in the direction of arrow 30 rotates the wheels 24, causing rotation of the sweeper brushes in opposite directions to sweep particulate material, such as leaves, clippings, twigs, etc., which is then collected in the hopper 26.

The construction of the housing assembly is best shown in FIGS. 1 and 3. The housing is an open ended enclosure as shown in FIG. 3. The opposed forward and rearward end walls, 32 and 34 respectively, define an hourglass configuration which provides baffeling for the brushes as described below. The side walls 36 complete the enclosure. A sweeper brush 38 is rotatably supported within the housing on shaft 40, which is perpendicular to the side walls 36. A second rotary brush 42 is rotatably supported on shaft 44. Brush 42 is located forward and above sweeper brush 38 within the housing enclosure. As described above, "forward" refers to the direction of movement of the sweeper, as shown by arrow 30. Movement of the sweeper in the direction of arrow 30 rotates the sweeper brushes in opposite directions as shown by arrows 45 and 46. Sweeper brush 38 is rotated in a clockwise direction as shown by arrow 45 to sweep particulate material upwardly into the housing enclosure, through inlet 48, as the sweeper assembly is moved in the direction of arrow 30. The second rotary brush 42 is oppositely rotated in a counter-clockwise direction to propel the particulate material through exit opening 50, into the hopper 26.

Forward wall 32 includes a lower inner arcuate surface 52 confronting the sweeper brush 38 and which defines an expanding throat into the housing enclosure and between rotary brushes 38 and 42. The opposed or rearward wall 34 includes an arcuate portion 54 confronting the sweeper brush 38 and an arcuate portion 56 confronting the second rotary brush 42 defining a decreasing throat between the brush and the baffle.

Particulate material is thereby swept upwardly by rotating sweeper brush 38 into the expanding throat 52, as shown by arrow 60. The lower badffle 52 is designed to achieve maximum air flow. This results in maximizing material transfer from the sweeper or primary brush 38 to the second rotary brush 42. This opitmum air flow is achieved by providing a large air volume in the interchange area between the sweeper and second rotary brushes and a minimum area or reducing throat between the second rotary brush 42 and the upper baffle face 56. The combination of the lower baffle face 52 and the expanding throat thereby optimizes the operation of the sweeper assembly of thisinvention while limiting clogging. Clogging may still occur, however where the sweeper engages a pile or accumulation of particulate material. The guard-drag plate is designed to eliminate clogging as described below.

The housing 22 is connected to the drawbar by a pair of opposed ears 64 which are bolted to the draw bar arm 28 at 66 and bolted to the housing by center bolts 68. As shown, ears 64 are generally horizontal where attached tothe drawbar and are turned or bent 90°, generally parallel to the side walls of the housing enclosure. The guard-drag plate 70 is secured at one end by bolt 72 to the drawbar 28 and opposed end is secured at opposite sides to ears 64 by bolts 74. As shown in FIG. 3, guard-drag plate 70 is a sheet, preferably formed of steel, which extends downwardly from the drawbar 28 and hopper 26 toward the lower edge of the housing 22. The plate is then turned upwardly spaced from the housing and the opposed edges are formed at a right angle for securement to the opposed ears 64. As shown, the lower edge 78 defines an arcuate drag surface preferably spaced below the forward or leading edge of the housing.

As described above, the plate 70 preferably extends downwardly toward the housing at an acute angle, preferably less than 30°. When the sweeper assembly engages an obstacle, such as a large rock or stump, the obstacle will first engage the inclined surface of plate 70, raising the entiresweeper assembly and preventing damage to the housing. Further, the midportion of plate 70 including the arcuate drag surface 78 is relatively resilient because only the opposed ends are fixed at 72 and 74, thereby limiting damage to the plate. When the sweeper assembly encounters a large accumulation or pile of particulate material, drag plate 70 will compress and spread the material, limiting or metering the particulate material swept by brush 38. Where the accumulation is sufficient to raise the sweeper, the wheels will beraised out of contact with the ground surface, stopping rotation of the brushes. The particulate material will thereby be spread over a great area, permitting the sweeper to pick-up the material in the next pass.

The guard-drag plate70 thereby provides several advantages over the prior art, limiting damage to the sweeper assembly and aiding in operation of the sweeper. It has been found in actual practice that the guard plate utilized in the sweeper of this invention eliminates clogging of the sweeper while protecting the sweeper against damage. These advantages are particularly important in a positive drive two stage sweeper of the present type where the brushes are driven by gears as described hereinbelow.

Figure 4:
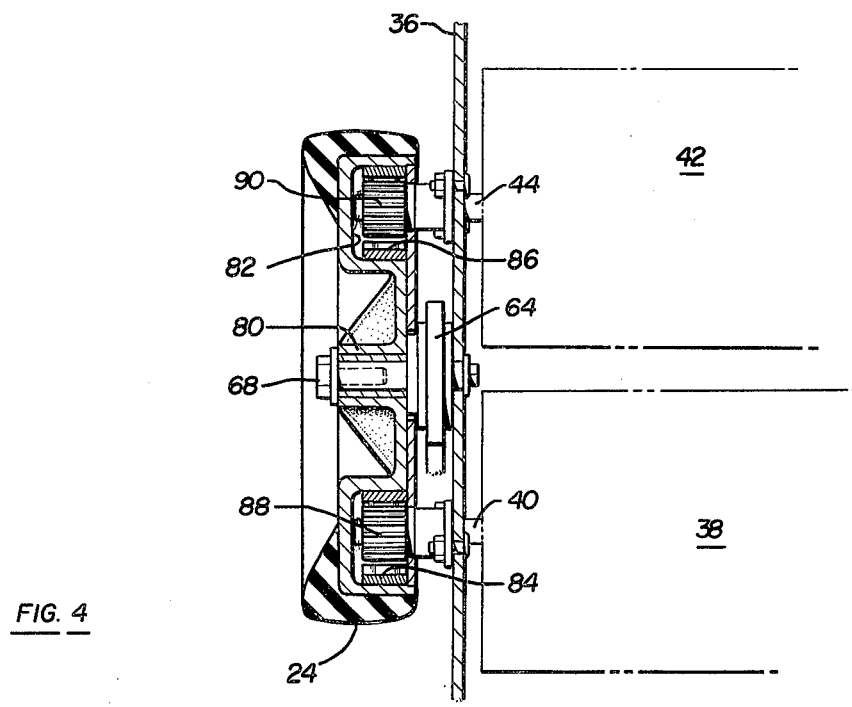
FIG. 4 is a partial cross-sectioned view of the drive means for the brush assembly in the direction of view arrows 4—4 of FIG. 1.

A suitable drive means for the sweeper and second rotary brush isshown in FIG. 4. This is a positive drive as disclosed in the above referenced patent of Rhodes et al assigned to the assignee of the instant application. Briefly, the drive means includes a metal hub 80 which is retained within one of the gound supporting wheels 24 of thw sweeper assembly. The hub includes an annular channel 82 concentric with the wheel having an outer planetary gear 84 on the radial outer wall of the channel and an inner planetary gear 86 on the raidal inner wall of the channel. The shaft 40 of the sweeper brush 38 includes a pinion gear 88 which engages the inner planetary gear 86 and the shaft 44 of the second rotary brush 42 includes a pinion gear 90 which engages the outerplanetary gear 84. The brushes are thus driven in opposite directions with the second rotary brush 42 driven at a greater speed than the sweeper brush 38. Other details of the positive drive are more fully disclosed in the above referenced patents of Rhodes et al, which is incorporated herein by reference. It is understood however that the sweeper assembly of the present invention may utilize any conventional drive means for the brush or brushes, although a positive drive means is preferred to accurately drive the brushes at the preferred speed ratios.

As will now be understood from the above referenced description, particulate material swept by the rotary brush assembly is propelled by the second rotary brush 42 into a hopper as shown by arrows 96 in FIG. 3. A suitable hopper assembly is best shown in FIG. 1. The disclosed hopper assembly includes a U-shaped upper tubular frame member 100 and a U-shaped lower tubular frame member 102 which define the shape of the hopper assembly 26. A cover 106 is stretched over the upper and lower frame members, which may then be sewn in place. A suitable cover material would be a nylon mesh, canvas or the like. As shown, the hopper is supported on the opposed draw bar arms 28 by pan 108.

As described in the above referenced patent of Rhodes et al, the hopper 26 may be rotated over the sweeper housing to unload the hopper and the sweeper housing may be rotated about the sheel axis to change the angular position of the sweeper brush 38 to accommodate the material swept and to permit transportation of the sweeper assembly. In the disclosed embodiment, the upper and lower frame members 100 and 102 are pivotally connected to the side walls of the housing by pivot pins 114. As described, the frame members are generally U-shaped, such that the opposed ends of each of the frame members are connected to opposite sides of the sweeper housing. The angular position of the sweeper assembly maay be adjusted in the disclosed embodiment by a latch means. The latch means include a bracket 118 connected to one of the ears 64 and a latch pin 120 which is selectively received in one of a plurality of apertures 122 in the side wall of the housing. The position of the sweeper brush 38 may therefore be adjusted simply by realeasing the latch pin 120 and rotating the housing to the desired position. The latch pin is then reinserted in one of the apertures 122, locking the sweeper assembly housing and the sweeper brush 38 in the desired position.

As will now be understood from the above description, the sweeper assembly of the present invention may be drawn in the direction of arrow 30 by connecting the draw bar arms 28 to a suitable tractor or other conveyance. A tow bar bracket is shown schematically at 124. The movement of the sweeper assembly in the direction of arrow 30 rotates the ground supporting wheels 24 in a clockwise direction, rotating the brushes 38 and 42 in opposite directions as shown in FIG. 3 by arrows 45 and 46. The particulate material which is to be collected is then swept upwardly by the sweeper rush 48, as shown by arrow 60, into the expanding throat of the housing. The particulate material is then received by the second rotary brush 42, propelled through the reducing thoat between the upper baffle 56 and the second rotary brush 42 and finally into the hopper 106. The guard-drag plate 70 will distribute theparticulate material across the opening 48 and prevent damage to the housing if the sweeper strikes an obstacle. Further, the acute angle defined by ghe drag plate will lift the sweeper assembly over obstacles or accumulated particulate material, compressing and distributing the particulate material for a second pass.

It will be understood that modifications may be made to the sweeper assembly of the present invention without departing from the preview of the appended claims. For example, the positive drive shown in FIG. 4 may be replaced by a more conventional impositive drive, such as a belt drive. Similarly, various hoper designs may be utilized depending upon the particular application of the sweeper assembly of this invention. The drag-plate assembly may also be utilized in single brush sweeper assemblies. Having described one embodiment of the sweeper assembly of the present invention, there follows the claims of the present invention.

I claim:

1. A rotary sweeper assembly, comprising a enclosed housing having a top and side walls and a lower inlet opening, ground tranversing wheels supporting said housing for movement along the ground, a rotary brush assembly within said housing enclosure lifting particulate material into said housing through said inlet opening and propelling the particulate material out of a forwardly opening outlet adjacent the tops of said housing enclosure and a hopper adjacent said outlet forward of said housing receiving particulate material, the improvement comprising a drag-guard plate extending from said hopper assembly at an acute angle to the ground surface toward said lower inlet opening, then said plate being turned upwardly adjacent said housing but spaced therefrom, said plate extending substantially across the entire forward end of said housing and the lower face defining an arcuate drag surface spaced below the lower forward end of said housing protecting said housing and lifting the sweeper assembly upon engaging an accumulation of particulate material.

2. The rotary sweeper assembly defined in claim 1, characterized in that said drag-guard plate extends at an acute angle of less than thirty degrees to the ground level.

3. The rotary sweeper assembly defined in claim 1, characterized in that said drag-guard plate is secured at one end to said hopper assembly and at the opposed end adjacent said housing, providing a free relatively resilient midportion including said arcuate drag surface.

4. A rotary sweeper assembly having a downwardly opening housing enclosure, a rotary brush assembly within said enclosure lifting particulate material into said housing enclosure through an inlet opening adjacent the forward end of said housing and propelling the material out of said enclosure through an outlet opening forwardly, the improvement comprising:
   a guard plate extending downwardly toward said inlet opening of said housing enclosure at an acute angle to the ground surface and said guard plate being turned upwardly adjacent said housing, but spaced therefrom;
   said guard plate having a lower edge defining a downwardly facing arcuate surface spaced below said forward housing end;
   said guard plate providing protection for said housing and a drag surface for said sweeper assembly limiting the intake of said sweeper compressing and distributing accumulations of particulate material.

5. The rotary sweeper assembly defined in claim 4, characterized in that said guard plate extends across the forward end of said housing generally parallel to said lower edge and defining an acute angle to the ground surface of less than thirty degrees.

6. The rotary sweeper assembly defined in claim 4, characterized in that said guard plate has opposed side ends secured to a frame assembly, providing a free relatively resilient midportion including said downwardly facing arcuate surface.

* * * * *